US012749669B2

(12) United States Patent
Tang et al.

(10) Patent No.: US 12,749,669 B2
(45) Date of Patent: Sep. 29, 2026

(54) NEGATIVE ELECTRODE ACTIVE MATERIAL, AND ELECTROCHEMICAL APPARATUS AND ELECTRONIC APPARATUS USING THE SAME

(71) Applicant: Ningde Amperex Technology Limited, Ningde City (CN)

(72) Inventors: Jia Tang, Ningde City (CN); Lihong He, Ningde City (CN); Pengyang Feng, Ningde City (CN); Yuansen Xie, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 775 days.

(21) Appl. No.: 17/963,564

(22) Filed: Oct. 11, 2022

(65) Prior Publication Data

US 2023/0049766 A1 Feb. 16, 2023

Related U.S. Application Data

(63) Continuation of application No. PCT/CN2020/084168, filed on Apr. 10, 2020.

(51) Int. Cl.

*H01M 4/04* (2006.01)
*H01M 4/02* (2006.01)
*H01M 50/46* (2021.01)

(52) U.S. Cl.

CPC ......... *H01M 4/0404* (2013.01); *H01M 50/46* (2021.01); *H01M 2004/021* (2013.01); *H01M 2004/027* (2013.01)

(58) Field of Classification Search

None

See application file for complete search history.

(56) References Cited

U.S. PATENT DOCUMENTS 10,490,818 B2 11/2019 Takeda
2004/0101756 A1 5/2004 Koyama et al.
(Continued)

FOREIGN PATENT DOCUMENTS

CN 1505192 A 6/2004
CN 103283068 A 9/2013
(Continued)

OTHER PUBLICATIONS

English Translation of Eguchi (JP2011009051) (Year: 2011).*
(Continued)

*Primary Examiner* — Jeffrey T Barton
*Assistant Examiner* — Karen J. Armstrong
(74) *Attorney, Agent, or Firm* — WHDA, LLP

(57) ABSTRACT

A negative electrode active material having a specific aspect ratio and sphericity in a cumulative particle volume distribution. When tested by using a dynamic particle image analyzer, when a cumulative particle volume distribution of the negative electrode active material is 10%, an aspect ratio $AR_{10}$ of the negative electrode active material satisfies $0.4 \le AR_{10} \le 0.55$, and a sphericity $S_{10}$ of the negative electrode active material satisfies $0.48 \le S_{10} \le 0.60$. The negative electrode active material improves rate performance, dynamics performance, and a deformation problem of the electrochemical apparatus.

13 Claims, 2 Drawing Sheets

(56) References Cited

U.S. PATENT DOCUMENTS

| | | | | |
|---|---|---|---|---|
| 2017/0373314 | A1 | 12/2017 | Takeda | |
| 2020/0083516 | A1* | 3/2020 | Hatanaka | H01G 11/86 |

FOREIGN PATENT DOCUMENTS

| | | | |
|---|---|---|---|
| CN | 104521038 | A | 4/2015 |
| CN | 107078288 | A | 8/2017 |
| CN | 107210424 | A | 9/2017 |
| JP | 2011-9051 | A | 1/2011 |
| JP | 2012-133981 | A | 7/2012 |
| JP | 2014-186955 | A | 10/2014 |
| JP | 2017126426 | A | 7/2017 |
| WO | 2012/133611 | A1 | 10/2012 |
| WO | 2015/158741 | A2 | 10/2015 |
| WO | 2015/158741 | A3 | 10/2015 |
| WO | 2016/121585 | A1 | 8/2016 |
| WO | 2017/221895 | A1 | 12/2017 |
| WO | 2018/179813 | A1 | 10/2018 |

OTHER PUBLICATIONS

Office Action dated Nov. 22, 2021, issued in counterpart CN application No. 202080004196.5 with English translation. (10 pages).

International Search Report dated Dec. 28, 2020, issued in counterpart International Application No. PCT/CN2020/084168, with English Translation (7 pages).

Office Action dated Jul. 19, 2022, issued in counterpart JP application No. 2021-512518 with English translation. (10 pages).

Extended (Supplementary) European Search Report dated May 26, 2023, issued in counterpart EP application No. 20930448.4. (7 pages).

Office Action dated Feb. 7, 2023, issued in counterpart JP application No. 2021-512518, with English translation. (5 pages).

* cited by examiner

NEGATIVE ELECTRODE ACTIVE MATERIAL, AND ELECTROCHEMICAL APPARATUS AND ELECTRONIC APPARATUS USING THE SAME

CROSS REFERENCE TO RELATED APPLICATIONS

This application is a continuation application of PCT application PCT/CN2020/084168, filed Apr. 10, 2020, the disclosures of which are incorporated herein by reference in its entirety.

TECHNICAL FIELD

This application relates to the energy storage field, and specifically, to a negative electrode active material, and an electrochemical apparatus and electronic apparatus using the same.

BACKGROUND

Electrochemical apparatuses (for example, lithium-ion batteries) are widely applied, thanks to their environmental friendliness, high working voltage, large specific capacity, and long cycle life, and have become a new type of green chemical power source with the greatest development potential in the world today. Small-sized lithium-ion batteries are usually used as power sources for driving portable electronic communications devices (for example, camcorders, mobile phones, or notebook computers), and in particular, for high-performance portable devices. Medium-sized and large-sized lithium-ion batteries with high output characteristics are developed and applied to electric vehicles (EV) and large-scale energy storage systems (ESS). As lithium-ion batteries are widely applied, an important direction of research and development is on problems of rate performance and kinetic performance, and the deformation of lithium-ion batteries. All such performance is related to the lithium precipitation phenomenon with the negative electrode. How to alleviate the lithium precipitation phenomenon with the negative electrode has become a key technical problem to be resolved urgently. Improving an active material in the negative electrode is one of research directions to resolve the foregoing problems.

In view of this, it is indeed necessary to provide an improved negative electrode active material, and an electrochemical apparatus and electronic apparatus using the same.

SUMMARY

This application provides a negative electrode active material, and an electrochemical apparatus and electronic apparatus using the same, in an attempt to resolve at least one problem in the related art at least to some extent.

According to one aspect of this application, this application provides a negative electrode active material, where, tested by using a dynamic particle image analyzer, when a cumulative particle volume distribution of the negative electrode active material is 10%, an aspect ratio $AR_{10}$ of the negative electrode active material satisfies $0.4 \le AR_{10} \le 0.55$, and a sphericity $S_{10}$ of the negative electrode active material satisfies $0.48 \le S_{10} \le 0.60$.

In some embodiments, the aspect ratio $AR_{10}$ of the negative electrode active material satisfies $0.42 \le AR_{10} \le 0.52$. In some embodiments, the aspect ratio $AR_{10}$ of the negative electrode active material satisfies $0.45 \le AR_{10} \le 0.50$. In some embodiments, the aspect ratio $AR_{10}$ of the negative electrode active material is 0.4, 0.42, 0.45, 0.48, 0.50, 0.52, or 0.55, or is in a range defined by any two of the values.

In some embodiments, the sphericity $S_{10}$ of the negative electrode active material satisfies $0.50 \le S_{10} \le 0.55$. In some embodiments, the sphericity $S_{10}$ of the negative electrode active material is 0.48, 0.50, 0.52, 0.55, 0.58, or 0.60, or is in a range defined by any two of the values.

According to an embodiment of this application, when the cumulative particle volume distribution of the negative electrode active material is 50%, the negative electrode active material satisfies at least one of conditions (a) or (b):

(a) an aspect ratio $AR_{50}$ of the negative electrode active material satisfies $0.6 \le AR_{50} \le 0.75$; or (b) a sphericity $S_{50}$ of the negative electrode active material satisfies $0.68 \le S_{50} \le 0.82$.

In some embodiments, the aspect ratio $AR_{50}$ of the negative electrode active material satisfies $0.62 \le AR_{50} \le 0.72$. In some embodiments, the aspect ratio $AR_{50}$ of the negative electrode active material satisfies $0.65 \le AR_{50} \le 0.70$. In some embodiments, the aspect ratio $AR_{50}$ of the negative electrode active material is 0.6, 0.62, 0.65, 0.68, 0.70, 0.72, or 0.75, or is in a range defined by any two of the values.

In some embodiments, the sphericity $S_{50}$ of the negative electrode active material satisfies $0.70 \le S_{50} \le 0.80$. In some embodiments, the sphericity $S_{50}$ of the negative electrode active material satisfies $0.72 \le S_{50} \le 0.75$. In some embodiments, the sphericity $S_{50}$ of the negative electrode active material is 0.68, 0.70, 0.72, 0.75, 0.78, 0.80, or 0.82, or is in a range defined by any two of the values.

According to an embodiment of this application, when the cumulative particle volume distribution of the negative electrode active material is 90%, the negative electrode active material satisfies at least one of conditions (c) or (d):

(c) an aspect ratio $AR_{90}$ of the negative electrode active material satisfies $0.82 \le AR_{90} \le 0.90$; or (d) a sphericity $S_{90}$ of the negative electrode active material satisfies $0.85 \le S_{90} \le 0.95$.

In some embodiments, the aspect ratio $AR_{90}$ of the negative electrode active material satisfies $0.85 \le AR_{90} \le 0.88$. In some embodiments, the aspect ratio $AR_{90}$ of the negative electrode active material is 0.82, 0.85, 0.88, or 0.90, or is in a range defined by any two of the values.

In some embodiments, the sphericity $S_{90}$ of the negative electrode active material satisfies $0.88 \le S_{90} \le 0.90$. In some embodiments, the sphericity $S_{90}$ of the negative electrode active material is 0.85, 0.88, 0.90, 0.92, or 0.95, or is in a range defined by any two of the values.

According to an embodiment of this application, a compacted density of the negative electrode active material is greater than 1.90 $g/cm^3$. In some embodiments, the compacted density of the negative electrode active material is greater than 1.95 $g/cm^3$. In some embodiments, the compacted density of the negative electrode active material is greater than 2.0 $g/cm^3$.

According to an embodiment of this application, the negative electrode active material includes primary particles and secondary particles, and based on a total quantity of particles of the negative electrode active material, a quantity of the primary particles is 20% to 55%. In some embodiments, based on the total quantity of particles of the negative electrode active material, the quantity of the primary particles is 25% to 50%. In some embodiments, based on the total quantity of particles of the negative electrode active material, the quantity of the primary particles is 30% to 40%. In some embodiments, based on the total quantity of particles of the negative electrode active material, the quantity of the primary particles is 30% to 35%. In some embodiments, based on the total quantity of particles of the negative electrode active material, the quantity of the primary particles is 25%, 30%, 35%, 40%, 45%, or 50%, or is in a range defined by any two of the values.

According to another aspect of this application, this application provides an electrochemical apparatus, including a positive electrode, a negative electrode, a separator, and an electrolyte solution, where the negative electrode includes a negative electrode current collector and a negative electrode active material layer, and the negative electrode active material layer includes the negative electrode active material according to this application.

According to an embodiment of this application, the negative electrode satisfies at least one of conditions (e) to (g):

(e) weight of the negative electrode active material layer is 0.095 $mg/mm^2$ to 0.105 $mg/mm^2$;

(f) a ratio C004/C110 of a peak area C004 of a side (004) to a peak area C110 of a side (110) of the negative electrode active material layer, obtained by performing an X-ray diffraction spectrum test, is in a range of 10 to 20; and (g) the negative electrode active material layer has a porosity of 20% to 45%.

In some embodiments, the weight of the negative electrode active material layer is 0.095 $mg/mm^2$ to 0.105 $mg/mm^2$. In some embodiments, the weight of the negative electrode active material layer is 0.095 $mg/mm^2$, 0.097 $mg/mm^2$, 0.099 $mg/mm^2$, 0.101 $mg/mm^2$, 0.103 $mg/mm^2$, or 0.105 $mg/mm^2$, or is in a range defined by any two of the values.

In some embodiments, the ratio C004/C110 of the negative electrode active material layer, obtained by performing the X-ray diffraction spectrum test, is in a range of 12 to 18. In some embodiments, the ratio C004/C110 of the negative electrode active material layer, obtained by performing the X-ray diffraction spectrum test, is in a range of 14 to 16. In some embodiments, the ratio C004/C110 of the negative electrode active material layer, obtained by performing the X-ray diffraction spectrum test, is 10, 11, 12, 13, 14, 15, 16, 17, 18, 19, or 20, or is in a range defined by any two of the values.

In some embodiments, the negative electrode active material layer has a porosity of 25% to 40%. In some embodiments, the negative electrode active material layer has a porosity of 30% to 35%. In some embodiments, the porosity of the negative electrode active material layer is 20%, 25%, 30%, 35%, 40%, or 45%, or is in a range defined by any two of the values.

According to an embodiment of this application, a coating is further included between the negative electrode current collector and the negative electrode active material layer, and a ratio of thickness of the coating to thickness of the negative electrode active material layer is in a range of 1:50 to 1:120. In some embodiments, the ratio of the thickness of the coating to the thickness of the negative electrode active material layer is in a range of 1:60 to 1:100. In some embodiments, the ratio of the thickness of the coating to the thickness of the negative electrode active material layer is in a range of 1:80 to 1:90. In some embodiments, the ratio of the thickness of the coating to the thickness of the negative electrode active material layer is 1:50, 1:60, 1:70, 1:80, 1:90, 1:100, 1:110, or 1:120, or is in a range defined by any two of the values.

According to an embodiment of this application, a bonding force between the negative electrode active material layer and the negative electrode current collector is greater than 18 N/m. In some embodiments, the bonding force between the negative electrode active material layer and the negative electrode current collector is greater than 20 N/m. In some embodiments, the bonding force between the negative electrode active material layer and the negative electrode current collector is greater than 25 N/m.

According to an embodiment of this application, the electrochemical apparatus satisfies the following relationship: $Y \leq 0.417X + A$, where X is a state of charge of the electrochemical apparatus, and $1 < X \leq 1.5$; and when the state of charge of the electrochemical apparatus is 1, thickness of the electrochemical apparatus is A mm; or when the state of charge of the electrochemical apparatus is X, thickness of the electrochemical apparatus is Y mm. In some embodiments, X is 1.1, 1.2, 1.3, 1.4, or 1.5.

According to still another aspect of this application, this application provides an electronic apparatus, including the electrochemical apparatus according to this application.

Additional aspects and advantages of this application are partially described and presented in subsequent descriptions, or explained by implementation of the embodiments of this application.

BRIEF DESCRIPTION OF DRAWINGS

To describe embodiments of this application, the following briefly describes the accompanying drawings required for describing the embodiments of this application or the prior art. Apparently, the accompanying drawings described below are merely some embodiments of this application. A person skilled in the art may still derive drawings for other embodiments from structures shown in these accompanying drawings without creative efforts.

DETAILED DESCRIPTION

Figure 1:
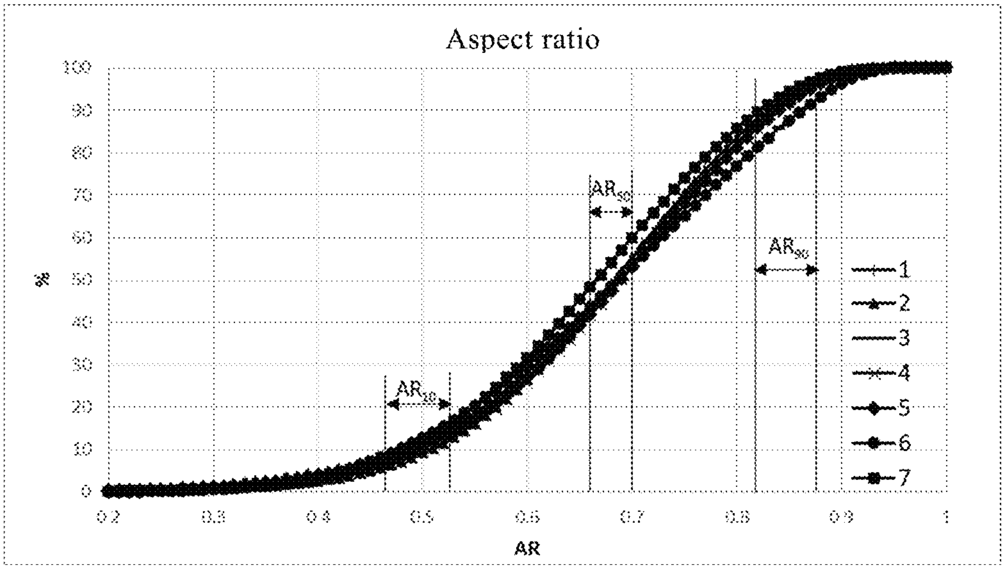
FIG. 1 presents an aspect ratio of a negative electrode active material in different cumulative particle volume distributions according to an embodiment of this application.

Embodiments of this application are described in detail below. In the specification of this application, identical or similar assemblies or assemblies with identical or similar functions are represented by similar reference numerals in the accompanying drawings. The embodiments in related accompanying drawings described herein are descriptive and illustrative, and are used to provide a basic understanding of this application. The embodiments of this application should not be construed as any limitation on this application.

In specific implementations and claims, a list of items connected by the term "at least one of" may mean any combination of the listed items. For example, if items A and B are listed, the phrase "at least one of A and B" means only A, only B, or A and B. In another example, if items A, B, and C are listed, the phrase "at least one of A, B, and C" means only A, only B, only C, A and B (excluding C), A and C (excluding B), B and C (excluding A), or all of A, B, and C.

The item A may include one element or a plurality of elements. The item B may include one element or a plurality of elements. The item C may include one element or a plurality of elements.

As used in this specification, an "aspect ratio" of a negative electrode active material is a ratio of a width to a length of a negative electrode active material particle. The aspect ratio of the negative electrode active material may be obtained through dynamic particle image analysis (for example, by using a Sympatec QICPIC dynamic particle image analyzer). The "width" of the negative electrode active material particle is a minimum distance between parallel lines that are tangent to a projection image of the particle. The "length" of the negative electrode active material particle is a maximum distance between parallel lines that are tangent to the projection image of the particle. When the aspect ratio of the negative electrode active material is small, the negative electrode active material particle is in a slim shape. If the aspect ratio of the negative electrode active material is closer to 1, it indicates that the width and length of the negative electrode active material particle are closer, that is, the negative electrode active material particle is more approximately in a circular shape.

As used in this specification, "$AR_n$" is a corresponding aspect ratio of the negative electrode active material particle when a cumulative particle volume distribution of the negative electrode active material is n %. "$AR_{10}$" indicates a corresponding aspect ratio of the negative electrode active material particle when the cumulative particle volume distribution of the negative electrode active material is 10%, as shown by "$AR_{10}$" in FIG. 1. "$AR_{50}$" indicates a corresponding aspect ratio of the negative electrode active material particle when the cumulative particle volume distribution of the negative electrode active material is 50%, as shown by "$AR_{50}$" in FIG. 1. "$AR_{90}$" indicates a corresponding aspect ratio of the negative electrode active material particle when the cumulative particle volume distribution of the negative electrode active material is 90%, as shown by "$AR_{90}$" in FIG. 1.

As used in this specification, "sphericity" of the negative electrode active material is a ratio of a perimeter of a projection of a sphere having a same volume as the negative electrode active material particle, to a perimeter of an actual projection of the negative electrode active material particle. If the sphericity of the negative electrode active material is closer to 1, it indicates that the negative electrode active material particle is more approximately in a spherical shape. When the sphericity of the negative electrode active material is 1, the negative electrode active material particle is exactly in a spherical shape. The sphericity of the negative electrode active material may be obtained through dynamic particle image analysis (for example, by using the Sympatec QICPIC dynamic particle image analyzer).

Figure 2:
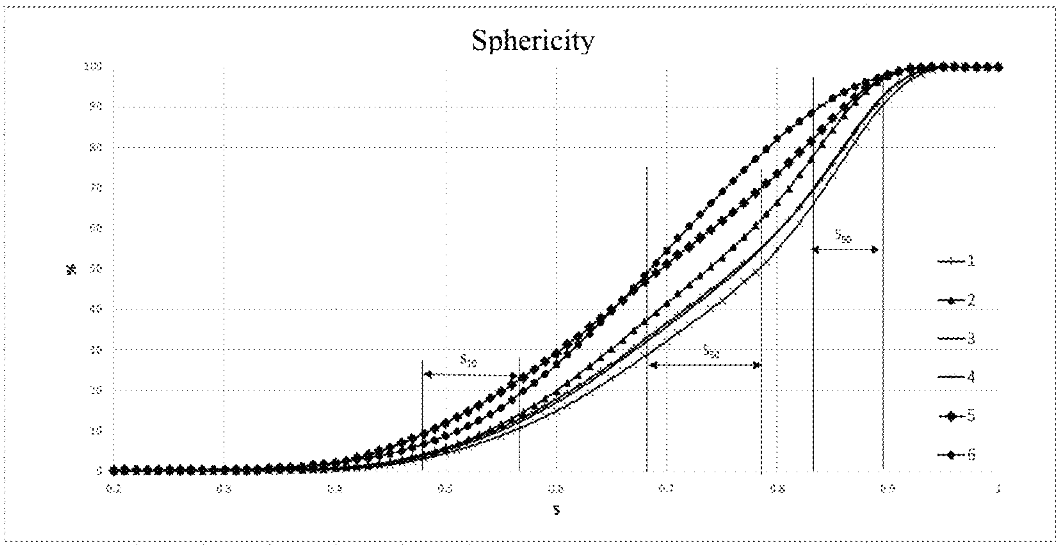
FIG. 2 presents a sphericity of a negative electrode active material in different cumulative particle volume distributions according to an embodiment of this application.

As used in this specification, "$S_n$" is a corresponding sphericity of the negative electrode active material particle when the cumulative particle volume distribution of the negative electrode active material is n %. "$S_{10}$" indicates a corresponding sphericity of the negative electrode active material particle when the cumulative particle volume distribution of the negative electrode active material is 10%, as shown by "$S_{10}$" in FIG. 2. "$S_{50}$" indicates a corresponding sphericity of the negative electrode active material particle when the cumulative particle volume distribution of the negative electrode active material is 50%, as shown by "$S_{50}$" in FIG. 2. "$S_{90}$" indicates a corresponding sphericity of the negative electrode active material particle when the cumulative particle volume distribution of the negative electrode active material is 90%, as shown by "$S_{90}$" in FIG. 2.

As electrochemical apparatuses (for example, lithium-ion batteries, which are hereinafter used as examples) are widely applied, a fast charging capability of an electrochemical apparatus becomes an important indicator for evaluating performance of the electrochemical apparatus. Rate performance may reflect the fast charging capability of a lithium-ion battery. In a cycle process of the lithium-ion battery, a lithium precipitation phenomenon may occur on a negative electrode surface, and the lithium precipitation phenomenon dramatically reduces rate performance of the lithium-ion battery. Especially, at a low temperature, dynamics performance of the negative electrode active material is reduced. Consequently, electrochemical polarization in a negative electrode is increased, and the lithium precipitation phenomenon occurs more easily. Lithium metal that is precipitated may form a lithium dendrite, which may penetrate a separator and cause a short circuit between the negative electrode and a positive electrode. In addition, deformation of the lithium-ion battery in the cycle process may also cause the lithium precipitation phenomenon. Therefore, how to improve the lithium precipitation phenomenon in the negative electrode has become one of research and development directions.

In this application, the shape and distribution of the negative electrode active material may be adjusted, to improve the lithium precipitation phenomenon in the cycle process of the electrochemical apparatus and improve rate performance and dynamics performance of the electrochemical apparatus, while improving the deformation problem of the electrochemical apparatus. Specifically, this application provides a negative electrode active material, tested by using a dynamic particle image analyzer, where when a cumulative particle volume distribution of the negative electrode active material is 10%, an aspect ratio $AR_{10}$ of the negative electrode active material satisfies $0.4 \le AR_{10} \le 0.55$, and a sphericity $S_{10}$ of the negative electrode active material satisfies $0.48 \le S_{10} \le 0.60$.

In some embodiments, the aspect ratio $AR_{10}$ of the negative electrode active material satisfies $0.42 \le AR_{10} \le 0.52$. In some embodiments, the aspect ratio $AR_{10}$ of the negative electrode active material satisfies $0.45 \le AR_{10} \le 0.50$. In some embodiments, the aspect ratio $AR_{10}$ of the negative electrode active material is 0.4, 0.42, 0.45, 0.48, 0.50, 0.52, or 0.55, or is in a range defined by any two of the values.

In some embodiments, the sphericity $S_{10}$ of the negative electrode active material satisfies $0.50 \le S_{10} \le 0.55$. In some embodiments, the sphericity $S_{10}$ of the negative electrode active material is 0.48, 0.50, 0.52, 0.55, 0.58, or 0.60, or is in a range defined by any two of the values.

Particles of the negative electrode active material (for example, graphite) usually pack a surface of a negative electrode current collector layer by layer based on a porosity in a range and different orientations, to form a negative electrode active material layer. Due to irregular packing of the negative electrode active material particles, if the negative electrode active material particles are excessively slim (for example, $AR_{10} < 0.3$), pores between small particles are reduced, and this is disadvantageous for electrolyte solution infiltration. Negative electrode active material particles in a sphere-like shape (for example, $S_{10} > 0.9$) elongate a lithium-ion transmission path, and increase resistance in lithium-ion intercalation and de-intercalation. In a process of preparing the negative electrode active material, the aspect ratio of the negative electrode active material may be controlled in a hierarchical mode, and then corners on a negative electrode active material surface part are removed by means of shaping to control the sphericity of the negative electrode active material. When the negative electrode active material satisfies $0.4 \le AR_{10} \le 0.55$ and $0.48 \le S_{10} \le 0.60$, some negative electrode active material particles are slim and have corners, and pores of the negative electrode active material may be filled with such particles. This helps suppress swelling of the negative electrode active material layer caused by lithium-ion intercalation and de-intercalation, and therefore improves a deformation problem and a lithium precipitation phenomenon in a cycle process of a lithium-ion battery.

According to an embodiment of this application, when the cumulative particle volume distribution of the negative electrode active material is 50%, an aspect ratio $AR_{50}$ of the negative electrode active material satisfies $0.6 \le AR_{50} \le 0.75$. In some embodiments, the aspect ratio $AR_{50}$ of the negative electrode active material satisfies $0.62 \le AR_{50} \le 0.72$. In some embodiments, the aspect ratio $AR_{50}$ of the negative electrode active material satisfies $0.65 \le AR_{50} \le 0.70$. In some embodiments, the aspect ratio $AR_{50}$ of the negative electrode active material is 0.6, 0.62, 0.65, 0.68, 0.70, 0.72, or 0.75, or is in a range defined by any two of the values.

According to an embodiment of this application, when the cumulative particle volume distribution of the negative electrode active material is 50%, a sphericity $S_{50}$ of the negative electrode active material satisfies $0.68 \le S_{50} \le 0.82$. In some embodiments, the sphericity $S_{50}$ of the negative electrode active material satisfies $0.70 \le S_{50} \le 0.80$. In some embodiments, the sphericity $S_{50}$ of the negative electrode active material satisfies $0.72 \le S_{50} \le 0.75$. In some embodiments, the sphericity $S_{50}$ of the negative electrode active material is 0.68, 0.70, 0.72, 0.75, 0.78, 0.80, or 0.82, or is in a range defined by any two of the values.

According to an embodiment of this application, when the cumulative particle volume distribution of the negative electrode active material is 90%, an aspect ratio $AR_{90}$ of the negative electrode active material satisfies $0.82 \le AR_{90} \le 0.90$. In some embodiments, the aspect ratio $AR_{90}$ of the negative electrode active material satisfies $0.85 \le AR_{90} \le 0.88$. In some embodiments, the aspect ratio $AR_{90}$ of the negative electrode active material is 0.82, 0.85, 0.88, or 0.90, or is in a range defined by any two of the values.

According to an embodiment of this application, when the cumulative particle volume distribution of the negative electrode active material is 90%, a sphericity $S_{90}$ of the negative electrode active material satisfies $0.85 \le S_{90} \le 0.95$. In some embodiments, the sphericity $S_{90}$ of the negative electrode active material satisfies $0.88 \le S_{90} \le 0.90$. In some embodiments, the sphericity $S_{90}$ of the negative electrode active material is 0.85, 0.88, 0.90, 0.92, or 0.95, or is in a range defined by any two of the values.

Negative electrode active material particles having different appearances are used in combination, so that when the negative electrode active material satisfies the foregoing $AR_{10}$, $AR_{50}$, $AR_{90}$, $S_{10}$, $S_{50}$, and $S_{90}$, the negative electrode active material looks round on the whole but still has an appearance with certain corners. The appearance that looks round on the whole allows presence of an appropriate quantity of pores between packing layers formed by the negative electrode active material particles. This shortens the lithium-ion transmission path, accelerates lithium-ion de-intercalation, and ensures smooth transmission of lithium ions in the pores. Presence of corners can increase friction between the negative electrode active material particles, so that stresses received by the negative electrode active material particles during lithium-ion intercalation and de-intercalation are evenly released to all directions. In this way, swelling of the negative electrode active material layer is suppressed, and a swelling problem of the lithium-ion battery in the cycle process is improved.

According to an embodiment of this application, a compacted density of the negative electrode active material is greater than 1.90 g/cm$^3$. In some embodiments, the compacted density of the negative electrode active material is greater than 1.95 g/cm$^3$. In some embodiments, the compacted density of the negative electrode active material is greater than 2.0 g/cm$^3$. A greater compacted density may enable mutual occlusion of the negative electrode active material particles having corners in their appearances, so that the negative electrode active material particles are laminated and arranged in a direction parallel with a current collector and that pores between laminated structures are reduced. Sufficient pores are still reserved between particles whose appearances are in a sphere-like shape, to ensure smooth transmission of lithium ions.

Figure 4:
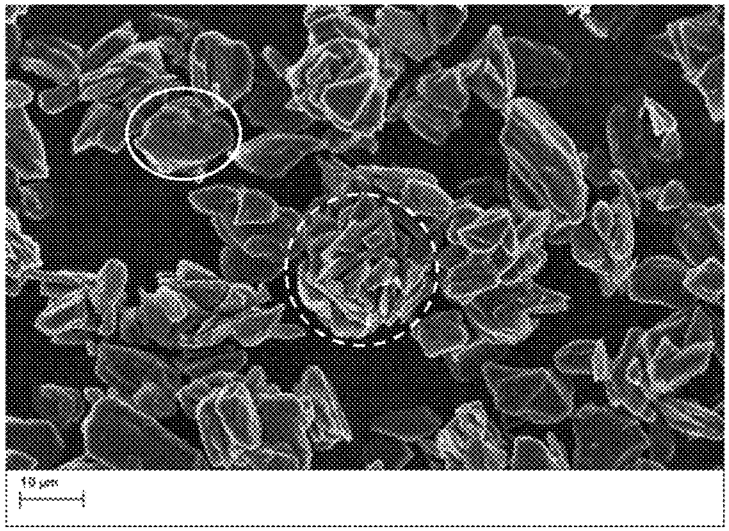
FIG. 4 presents a scanning electron microscope (SEM) view of a negative electrode material according to an embodiment of this application.

According to an embodiment of this application, the negative electrode active material includes primary particles (for example, particles circled by solid lines in FIG. 4) and secondary particles (for example, particles circled by dashed lines in FIG. 4).

According to an embodiment of this application, based on a total quantity of particles of the negative electrode active material, a quantity of the primary particles is 20% to 55%. In some embodiments, based on the total quantity of particles of the negative electrode active material, the quantity of the primary particles is 25% to 50%. In some embodiments, based on the total quantity of particles of the negative electrode active material, the quantity of the primary particles is 30% to 40%. In some embodiments, based on the total quantity of particles of the negative electrode active material, the quantity of the primary particles is 30% to 35%. In some embodiments, based on the total quantity of particles of the negative electrode active material, the quantity of the primary particles is 25%, 30%, 35%, 40%, 45%, or 50%, or is in a range defined by any two of the values. When the negative electrode active material includes a quantity of primary particles in the foregoing range, anisotropy of the negative electrode active material particles is increased. Therefore, the swelling problem of the lithium-ion battery in the cycle process can be effectively improved, and the deformation of the lithium-ion battery is suppressed. In addition, the quantity of primary particles in the foregoing range can further help increase an energy density of the negative electrode active material.

This application further provides an electrochemical apparatus, where the electrochemical apparatus includes a positive electrode, a negative electrode, a separator, and an electrolyte solution. The following describes the positive electrode, negative electrode, separator, and electrolyte solution that can be used in this application.

Negative Electrode

The negative electrode used by the electrochemical apparatus in this application includes a negative electrode current collector and a negative electrode active material layer, and the negative electrode active material layer includes the negative electrode active material according to this application.

According to an embodiment of this application, the negative electrode active material layer is disposed on the negative electrode current collector. In some embodiments, the negative electrode active material layer is disposed on two sides of the negative electrode current collector. In some embodiments, the negative electrode current collector includes a region of a single-sided negative electrode active material layer.

According to an embodiment of this application, weight of the negative electrode active material layer is 0.095 g/$cm^2$ to 0.105 g/$cm^2$. In some embodiments, the weight of the negative electrode active material layer is 0.095 g/$cm^2$ to 0.101 g/$cm^2$. In some embodiments, the weight of the negative electrode active material layer is 0.095 g/$cm^2$, 0.097 g/$cm^2$, 0.099 g/$cm^2$, 0.101 g/$cm^2$, 0.103 g/$cm^2$, or 0.105 g/$cm^2$, or is in a range defined by any two of the values. When the weight of the negative electrode active material layer is in the foregoing range, it helps the electrolyte solution infiltrate the negative electrode active material layer, and therefore, transmission of lithium ions is accelerated.

According to an embodiment of this application, a ratio C004/C110 of a peak area C004 of a side (004) to a peak area C110 of a side (110) of the negative electrode active material layer, obtained by performing an X-ray diffraction spectrum test, is in a range of 10 to 20. In some embodiments, the ratio C004/C110 of the negative electrode active material layer, obtained by performing the X-ray diffraction spectrum test, is in a range of 12 to 18. In some embodiments, the ratio C004/C110 of the negative electrode active material layer, obtained by performing the X-ray diffraction spectrum test, is in a range of 14 to 16. In some embodiments, the ratio C004/C110 of the negative electrode active material layer, obtained by performing the X-ray diffraction spectrum test, is 10, 11, 12, 13, 14, 15, 16, 17, 18, 19, or 20, or is in a range defined by any two of the values. A value of C004/C110 of the negative electrode active material layer can reflect an orientation of the negative electrode active material layer. When C004/C110 is excessively large or small, the negative electrode active material layer shows great anisotropy. When C004/C110 is large, that is, when the peak area C004 of the side (004) is large, in a compacted density, negative electrode active material particles tend to be arranged on the current collector in parallel with the current collector. When C004/C110 is small, that is, when the peak area C110 of the side (110) is large, in a compacted density, negative electrode active material particles tend to be arranged on the current collector vertically to the current collector. When C004/C110 of the negative electrode active material layer is in the foregoing range, one part of negative electrode active material particles are arranged on the current collector in parallel with the current collector, and the other part of the negative electrode active material particles are arranged on the current collector vertically to the current collector, so that the negative electrode active material layer has appropriate anisotropy in every direction. This helps improve swelling and deformation problems of a lithium-ion battery in a cycle process. According to an embodiment of this application, the negative electrode active material layer has a porosity of 20% to 45%. In some embodiments, the negative electrode active material layer has a porosity of 25% to 40%. In some embodiments, the negative electrode active material layer has a porosity of 30% to 35%. In some embodiments, the porosity of the negative electrode active material layer is 20%, 25%, 30%, 35%, 40%, or 45%, or is in a range defined by any two of the values. When the porosity of the negative electrode active material layer is in the foregoing range, it helps the electrolyte solution infiltrate the negative electrode active material layer, shorten a lithium-ion transmission path, and accelerate lithium-ion de-intercalation, while helping form an appropriate solid electrolyte interface (SEI) film and reduce loss of lithium ions.

The porosity of the negative electrode active material layer may be implemented by controlling roll-in pressure in a negative electrode preparation process. By controlling the roll-in pressure, a continuous change of thickness of the negative electrode active material layer can be implemented, so that the porosity of the negative electrode active material layer can be controlled. The porosity of the negative electrode active material layer may be obtained by performing a test according to the standard GB/T24586-2009 *Iron Ores—Determination of Apparent Density, True Density, and Porosity.*

According to an embodiment of this application, a coating is further included between the negative electrode current collector and the negative electrode active material layer, and a ratio of thickness of the coating to thickness of the negative electrode active material layer is in a range of 1:50 to 1:120. In some embodiments, the ratio of the thickness of the coating to the thickness of the negative electrode active material layer is in a range of 1:60 to 1:100. In some embodiments, the ratio of the thickness of the coating to the thickness of the negative electrode active material layer is in a range of 1:80 to 1:90. In some embodiments, the ratio of the thickness of the coating to the thickness of the negative electrode active material layer is 1:50, 1:60, 1:70, 1:80, 1:90, 1:100, 1:110, or 1:120, or is in a range defined by any two of the values.

According to an embodiment of this application, the coating includes a conductive layer. In some implementation solutions, a conductive material of the conductive layer may include any conductive material, provided that the conductive material does not cause a chemical change. Non-restrictive examples of the conductive material include carbon-based materials (for example, natural graphite, artificial graphite, carbon black, acetylene black, Ketjen black, carbon fibers, carbon nanotubes, and graphene), metal-based materials (for example, metal powder and metal fibers, such as copper, nickel, aluminum, and silver), conductive polymers (for example, polyphenylene derivatives), and mixtures thereof.

According to an embodiment of this application, a bonding force between the negative electrode active material layer and the negative electrode current collector is greater than 18 N/m. In some embodiments, the bonding force between the negative electrode active material layer and the negative electrode current collector is greater than 20 N/m. In some embodiments, the bonding force between the negative electrode active material layer and the negative electrode current collector is greater than 25 N/m. When the bonding force between the negative electrode active material layer and the negative electrode current collector is in the foregoing range, film stripping or burr generation in a roll-in or slitting operation in the negative electrode preparation process can be avoided, and therefore, potential safety hazards are avoided. In addition, it is further ensured that internal resistance of the battery is in an acceptable range, and dynamics performance of the electrochemical apparatus is ensured.

Bonding between the negative electrode active material layer and the negative electrode current collector may be implemented by controlling the roll-in operation in the negative electrode preparation process. Specifically, the bonding between the negative electrode active material layer and the negative electrode current collector may be tested by using an Instron (model number 33652) tester: taking an electrode plate that is 15-20 mm long; fixing the electrode plate on a steel plate by using a 3M double-sided adhesive tape; attaching the adhesive tape to a surface of the negative electrode active material layer, where one side of the adhesive tape is connected to a paper tape having a same width as the adhesive tape; adjusting a limiting block of a tensile machine to an appropriate position, and folding the paper tape up and sliding for 40 mm at a sliding speed of 50 mm/min; and testing the bonding force between the negative electrode active material layer and the negative electrode current collector at 180° (that is, reverse stretching).

According to an embodiment of this application, the electrochemical apparatus satisfies the following relationship: $Y \leq 0.417X + A$, where X is a state of charge of the electrochemical apparatus, and $1 < X \leq 1.5$; and when the state of charge of the electrochemical apparatus is 1, thickness of the electrochemical apparatus is A mm; or when the state of charge of the electrochemical apparatus is X, thickness of the electrochemical apparatus is Y mm. In some embodiments, X is 1.1, 1.2, 1.3, 1.4, or 1.5. When X, Y, and A satisfy the foregoing relationship, the thickness of the electrochemical apparatus in an overcharging state changes slightly, that is, the electrochemical apparatus is basically not deformed.

The negative electrode current collector in this application may be selected from copper foil, nickel foil, stainless steel foil, titanium foil, nickel foam, copper foam, a polymer substrate coated with conductive metal, and any combination thereof.

According to an embodiment of this application, the negative electrode further includes a binder, and the binder is selected from at least one of the following: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-difluoroethylene), polyethylene, polypropylene, styrene-butadiene rubber, styrene-butadiene rubber, epoxy resin, nylon, and the like.

Positive Electrode

The positive electrode includes a positive electrode current collector and a positive electrode active material disposed on the positive electrode current collector. Specific types of positive electrode active materials are not subject to specific limitations, and can be selected according to requirements.

In some implementation solutions, the positive electrode active material includes a positive electrode material that can absorb and release Li(Li). Examples of positive electrode materials that can absorb or release Li(Li) may include lithium cobalt oxide, lithium nickel cobalt manganate, lithium nickel cobalt aluminate, lithium manganate oxide, lithium manganese iron phosphate, lithium vanadium phosphate, lithium vanadyl phosphate, lithium iron phosphate, lithium titanate, and lithium-rich manganese-based materials.

Specifically, a chemical formula of lithium cobalt oxide may be a chemical formula 1:

$$Li_xCo_aM1_bO_{2-c} \quad \text{chemical formula 1}$$

where M1 means being selected from at least one of the following: nickel (Ni), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and values of x, a, b, and c are respectively in the following ranges: $0.8 \leq x \leq 1.2$, $0.8 \leq a \leq 1$, $0 \leq b \leq 0.2$, and $-0.1 \leq c \leq 0.2$.

A chemical formula of lithium nickel cobalt manganate or lithium nickel cobalt aluminate may be a chemical formula 2:

$$Li_yNi_dM2_eO_{2-f} \quad \text{chemical formula 2}$$

where M2 means being selected from at least one of the following: cobalt (Co), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), tungsten (W), zirconium (Zr), and silicon (Si), and values of y, d, e, and f are respectively in the following ranges: $0.8 \leq y \leq 1.2$, $0.3 \leq d \leq 0.98$, $0.02 \leq e \leq 0.7$, and $-0.1 \leq f \leq 0.2$.

A chemical formula of lithium manganate oxide may be a chemical formula 3:

$$Li_2Mn_{2-g}M3_gO_{4-h} \quad \text{chemical formula 3}$$

where M3 means being selected from at least one of the following: cobalt (Co), nickel (Ni), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W), and values of z, g, and h are respectively in the following ranges: $0.8 \leq z \leq 1.2$, $0 \leq g \leq 1.0$, and $-0.2 \leq h \leq 0.2$.

In some embodiments, weight of the positive electrode active material layer is 1.5 to 15 times that of the negative electrode active material layer. In some embodiments, the weight of the positive electrode active material layer is 3 to 10 times that of the negative electrode active material layer. In some embodiments, the weight of the positive electrode active material layer is 5 to 8 times that of the negative electrode active material layer. In some embodiments, the weight of the positive electrode active material layer is 1.5, 2, 3, 4, 5, 6, 7, 8, 9, 10, 11, 12, 13, 14, or 15 times that of the negative electrode active material layer.

In some embodiments, the positive electrode active material layer may have a coating on its surface, or may be mixed with another compound having a coating. The coating may include at least one coating element compound selected from oxide of coating elements, hydroxide of coating elements, oxyhydroxide of coating elements, oxycarbonate (oxycarbonate) of coating elements, and hydroxycarbonate (hydroxycarbonate) of coating elements. The compound used for the coating may be amorphous or crystalline. The coating elements included in the coating may include Mg, Al, Co, K, Na, Ca, Si, Ti, V, Sn, Ge, Ga, B, As, Zr, F, or a mixture thereof. The coating may be applied by using any method, provided that the method does not have adverse impact on performance of the positive electrode active material. For example, the method may include any coating method well known to a person of ordinary skill in the art, such as spraying or dipping.

In some implementation solutions, the positive electrode active material layer further includes a binder, and optionally further includes a positive electrode conductive material.

The binder can enhance bonding between particles of the positive electrode active material, and binding between the positive electrode active material and the current collector. Non-restrictive examples of the binder include polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-difluoroethylene), polyethylene, polypropylene, styrene-butadiene rubber, acrylic styrene-butadiene rubber, epoxy resin, nylon, and the like.

The positive electrode active material layer includes a positive electrode conductive material, thereby imparting conductivity to the electrode. The positive electrode conductive material may include any conductive material, provided that the conductive material does not cause a chemical change. Non-restrictive examples of the positive electrode conductive material include carbon-based materials (for example, natural graphite, artificial graphite, carbon black, acetylene black, Ketjen black, and carbon fibers), metal-based materials (for example, metal powder and metal fibers, including, for example, copper, nickel, aluminum, and silver), conductive polymers (for example, polyphenylene derivatives), and mixtures thereof.

The positive electrode current collector used for the electrochemical apparatus according to this application may be aluminum (Al), but is not limited thereto.

Electrolyte Solution

The electrolyte solution that can be used in the embodiments of this application may be an electrolyte solution known in the prior art.

Electrolytes that can be used in the electrolyte solution in the embodiments of this application include but are not limited to an inorganic lithium salt, for example, $LiClO_4$, $LiAsF_6$, $LiPF_6$, $LiBF_4$, $LiSbF_6$, $LiSO_3F$, or $LiN(FSO_2)_2$; an organic lithium salt containing fluorine, for example, $LiCF_3SO_3$, $LiN(FSO_2)(CF_3SO_2)$, $LiN(CF_3SO_2)_2$, $LiN(C_2F_5SO_2)_2$, lithium-hexafluoropropane-1,3-disulfonimide, lithium tetrafluoroethane-1,2-disulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, or $LiBF_2(C_2F_5SO_2)_2$; and a lithium salt containing a dicarboxylic acid coordination compound, such as lithium bis(oxalato) borate, lithium difluoro (oxalato) borate, lithium tris(oxalato)phosphate, lithium difluoro bis(oxalato)phosphate, or lithium tetrafluoro (oxalato)phosphate. In addition, one of the foregoing electrolytes may be used alone, or two or more thereof may be used. In some embodiments, the electrolyte includes a combination of $LiPF_6$ and $LiBF_4$. In some embodiments, the electrolyte includes a combination of an inorganic lithium salt such as $LiPF_6$ or $LiBF_4$ and an organic lithium salt containing fluorine such as $LiCF_3SO_3$, $LiN(CF_3SO_2)_2$, or $LiN(C_2F_5SO_2)_2$. In some embodiments, the electrolyte includes $LiPF_6$.

In some embodiments, a concentration of the electrolyte is in a range of 0.8 mol/L to 3 mol/L, for example, is in a range of 0.8 mol/L to 2.5 mol/L, 0.8 mol/L to 2 mol/L, or 1 mol/L to 2 mol/L, or for another example, is 1 mol/L, 1.15 mol/L, 1.2 mol/L, 1.5 mol/L, 2 mol/L, or 2.5 mol/L.

Solvents that can be used in the electrolyte solution in the embodiments of this application include but are not limited to cyclic carbonate, chain carbonate, cyclic carboxylate, chain carboxylate, cyclic ether, chain ether, an organic solvent containing phosphorus, an organic solvent containing sulfur, and an aromatic solvent containing fluorine.

In some embodiments, the cyclic carbonate includes but is not limited to ethylene carbonate(ethylene carbonate, EC), propylene carbonate (propylene carbonate, PC), and 1,2-butylene carbonate.

In some embodiments, the cyclic carbonate has three to six carbon atoms.

In some embodiments, the chain carbonate includes but is not limited to: chain carbonate such as dimethyl carbonate, ethyl methyl carbonate, diethyl carbonate (diethyl carbonate, DEC), methyl n-propyl carbonate, ethyl n-propyl carbonate, and di-n-propyl carbonate, and fluorine-substituted chain carbonate such as bis(fluoromethyl) carbonate, bis (difluoromethyl) carbonate, bis(trifluoromethyl) carbonate, bis(2-fluoroethyl) carbonate, bis(2,2-difluoroethyl) carbonate, bis(2,2,2-trifluoroethyl) carbonate, 2-fluoroethyl methyl carbonate, 2,2-difluoroethyl methyl carbonate, and 2,2,2-trifluoroethyl methyl carbonate.

In some embodiments, the cyclic carboxylate includes but is not limited to γ-butyrolactone and γ-valerolactone. In some embodiments, some hydrogen atoms in the cyclic carboxylate may be replaced with fluorine.

In some embodiments, the chain carboxylate includes but is not limited to methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, menthyl valerate, ethyl valerate, methyl pivalate, and ethyl pivalate. In some embodiments, some hydrogen atoms in the chain carboxylate may be replaced with fluorine. In some embodiments, fluorine-substituted chain carboxylate includes but is not limited to methyl trifluoroacetate, ethyl trifluoroacetate, propyl trifluoroacetate, n-butyl trifluoroacetate, and 2,2,2-trifluoroethyl trifluoroacetate.

In some embodiments, the cyclic ether includes but is not limited to tetrahydrofuran, 2-methyltetrahydrofuran, 1,3-dioxolane, 2-methyl-1,3-dioxolane, 4-methyl-1,3-dioxolane, 1,3-dioxane, 1,4-dioxane, and 2,2-dimethoxypropane.

In some embodiments, the chain ether includes but is not limited to dimethoxymethane, 1,1-dimethoxy ethane, 1,2-dimethoxy ethane, diethoxymethane, 1,1-diethoxy ethane, 1,2-diethoxy ethane, ethoxy methoxy methane, 1,1-ethoxy methoxy ethane, and 1,2-ethoxy methoxy ethane.

In some embodiments, the organic solvent containing phosphorus includes but is not limited to trimethyl phosphate, triethyl orthophosphate, dimethylethyl phosphate, diethyl methylphosphonate, methylethylene phosphate, ethylene ethyl phosphate, triphenyl phosphate, trimethyl phosphite, triethyl phosphite, triphenyl phosphite, tris(2,2,2-trifluoroethyl)phosphate, and tris(2,2,3,3,3-pentafluoropropyl) phosphate.

In some embodiments, the organic solvent containing sulfur includes but is not limited to sulfolane, 2-dimethylsulfolane, 3-dimethylsulfolane, methyl sulfonyl methane, diethyl sulfone, ethyl methyl sulfone, methylpropyl sulfone, dimethyl sulfoxide, methyl methanesulfonate, ethyl methanesulfonate, methyl ethanesulfonate, ethyl ethanesulfonate, dimethyl sulfate, diethyl sulfate, and butyl sulfate. In some embodiments, some hydrogen atoms in the organic solvent containing sulfur may be replaced with fluorine.

In some embodiments, the aromatic solvent containing fluorine includes but is not limited to fluorobenzen, difluorobenzene, trifluorobenzene, tetrafluorobenzene, pentafluorobenzene, hexafluorobenzene, and benzotrifluoride.

In some embodiments, a solvent used in the electrolyte solution in this application includes one or more of the foregoing solvents. In some embodiments, the solvent used in the electrolyte solution in this application includes cyclic carbonate, chain carbonate, cyclic carboxylate, chain carboxylate, or a combination thereof. In some embodiments, the solvent used in the electrolyte solution in this application includes an organic solvent selected from a group formed by the following substances: ethylene carbonate, propylene carbonate, diethyl carbonate, ethyl propionate, propyl propionate, propyl acetate, ethyl acetate, or a combination thereof. In some embodiments, the solvent used in the electrolyte solution in this application includes ethylene carbonate, propylene carbonate, diethyl carbonate, ethyl propionate, propyl propionate, γ-butyrolactone, or a combination thereof.

Additives that can be used in the electrolyte solution in the embodiments of this application include but are not limited to a compound having two or three cyanogroups, a cyclic carbonate containing a carbon-carbon double bond, a compound containing a sulfur-oxygen double bond, and lithium difluorophosphate.

In some embodiments, the compound having two or three cyanogroups may include at least one selected from succinonitrile (SN), adiponitrile (ADN), ethylene glycol bis(propionitrile) ether (EDN), 1,3,5-pentanetricarbonitrile, 1,2,3-propanetricarbonitrile, 1,3,6-hexyltrimethonitrile (HTCN), 1,2,6-hexyltrimethonitrile, 1,2,3-tris(2-cyanoethoxy)propane (TCEP), or 1,2,4-tris(2-cyanoethoxy)butane.

In some embodiments, the cyclic carbonate containing a carbon-carbon double bond specifically includes but is not limited to at least one of vinylene carbonate, methyl vinylene carbonate, ethyl vinylene carbonate, Vinyl ethylene carbonate, or 1,2-dimethylvinyl carbonate.

In some embodiments, the compound containing a sulfur-oxygen double bond includes but is not limited to at least one of ethylene sulfate, 1,2-propanediol sulfate, 1,3-propane sultone, 1-fluoro-1,3-propane sultone, 2-fluoro-1,3-propane sultone, or 3-fluoro-1,3-propane sultone.

Separator

In some implementation solutions, the separator is disposed between the positive electrode and the negative electrode to avoid a short circuit. The material and shape of the separator that can be used in the embodiments of this application are not specifically limited, and any technology disclosed in the prior art may be used for the separator. In some implementation solutions, the separator includes a polymer or an organic substance or the like formed by a material that is stable against the electrolyte solution in this application.

For example, the separator may include a substrate layer and a surface treatment layer. The substrate layer is a non-woven fabric, a film, or a composite film with a porous structure, and a material of the substrate layer is selected from at least one of polyethylene, polypropylene, polyethylene terephthalate, and polyimide. Specifically, a polypropylene porous film, a polyethylene porous film, a polypropylene non-woven fabric, a polyethylene non-woven fabric, or a polypropylene-polyethylene-polypropylene porous composite film may be selected. The porous structure can improve heat resistance, oxidation resistance, and electrolyte solution infiltration performance of the separator, and enhance adhesion between the separator and an electrode plate.

A surface treatment layer is disposed on at least one surface of the substrate layer, and the surface treatment layer may be a polymer layer or an inorganic substance layer, or may be a layer formed by a mixture of a polymer and an inorganic substance.

The inorganic substance layer includes inorganic particles and a binder. The inorganic particles are selected from one or a combination of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from one or a combination of polyvinylidene fluoride, a copolymer of vinylidene fluoride and hexafluoropropylene, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene.

The polymer layer includes a polymer, and a material of the polymer is selected from at least one of polyamide, polyacrylonitrile, acrylate polymer, polyacrylic acid, polyacrylate, polyvinylpyrrolidone, polyvinyl ether, polyvinylidene fluoride, and poly(vinylidene fluoride-hexafluoropropylene).

Electrochemical Apparatus

This application further provides an electrochemical apparatus, where the electrochemical apparatus includes a positive electrode, an electrolyte solution, and a negative electrode, the positive electrode includes a positive electrode active material layer and a positive electrode current collector, the negative electrode includes a negative electrode active material layer and a negative electrode current collector, and the negative electrode active material layer includes the negative electrode active material according to this application.

The electrochemical apparatus in this application includes any apparatus on which electrochemical reactions occur. Its specific examples include all kinds of primary batteries, secondary batteries, fuel batteries, solar batteries, or capacitors. Particularly, the electrochemical apparatus is a lithium secondary battery, including a lithium metal secondary battery, a lithium-ion secondary battery, a lithium polymer secondary battery, or a lithium-ion polymer secondary battery.

Electronic Apparatus

This application provides another electronic apparatus, where the electronic apparatus includes the electrochemical apparatus according to this application.

A purpose of the electrochemical apparatus in this application is not specifically limited. It can be used for any known electronic apparatus in the prior art. In some implementation solutions, the electrochemical apparatus in this application may be used, without limitation, in a notebook computer, a stylus-input computer, a mobile computer, an e-book player, a portable phone, a portable fax, a portable copier, a portable printer, a stereo headphone, a video recorder, an LCD TV, a handy cleaner, a portable CD player, a mini disk, a transceiver, an electronic notebook, a calculator, a memory card, a portable recorder, a radio, a backup power supply, a motor, a vehicle, a motorcycle, a power assisted cycle, a bicycle, a lighting appliance, a toy, a game player, a clock, an electric tool, a flash lamp, a camera, a large household battery, a lithium-ion capacitor, or the like.

The following uses a lithium-ion battery as an example and describes preparation of a lithium-ion battery with reference to specific examples. A person skilled in the art understands that a preparation method described in this application is only an example, and that all other suitable preparation methods fall within the scope of this application.

EXAMPLES

The following describes performance evaluation performed based on examples of a lithium-ion battery in this application and comparative examples.

I. Preparation of a Lithium-Ion Battery

1. Preparing a Negative Electrode

Graphite, styrene-butadiene rubber (SBR for short), and sodium carboxymethyl cellulose (CMC for short), which were negative electrode active substances, were fully stirred and mixed based on a weight ratio of 95:2:3 in a deionized water solvent, to form even negative electrode slurry; the slurry was applied to two surfaces of copper foil of a current collector coated with a primer layer (such as carbon black), where thickness of the primer layer was 1.0 μm, and after the slurry was dried, cold pressing was performed to obtain a negative electrode active material layer; and then the negative electrode active material layer was piece-cut, and welded with a tab, and a negative electrode was obtained. A weight of the negative electrode active material layer was 0.100 mg/mm$^2$, and thickness of the negative electrode active material layer was 130 μm. A weight of a negative electrode active material layer on any surface of a negative electrode current collector was calculated as the weight of the negative electrode active material layer.

The aspect ratio and sphericity of the negative electrode active material could be controlled as follows: In the process of preparing the negative electrode active material, prepared graphite was fed through a feed system into a shaping region and then ground to make surfaces of particles having corners, thus to control the aspect ratio and sphericity of each particle; and then the ground particles were classified by using an automatic shunting and classifying region, to obtain particles to be distributed.

Primary particles of the negative electrode active material were samples obtained by directly graphitizing crushed particles of a particle size distribution, and secondary particles of the negative electrode active material were secondary particles obtained after a granulation device performed heat treatment on crushed particles mixed with a proportion of bitumen at a particular temperature so that particles were bonded together by the bitumen, and then the mixture was graphitized. Primary particle content of the negative electrode active material was obtained by controlling a mixture proportion of the primary particles and the secondary particles.

A test method for powder compacting of the negative electrode active material was: weighing 1 g powder and placing the powder in a mold (its diameter was 13 mm), then placing the mold in an automatic powder compacting test device (SUNS UTM7305), and finally measuring, by applying pressure to the mold by using a device, a compacted powder density of the powder under a condition of St.

2. Preparing a Positive Electrode

Lithium cobalt oxide ($LiCoO_2$), acetylene black, and polyvinylidene fluoride (PVDF) were fully stirred and mixed based on a weight ratio of 96:2:2 in an appropriate N-methylpyrrolidone (NMP) solvent, to form even positive electrode slurry. The slurry was applied to aluminum foil of a positive electrode current collector, and then was dried, cold-pressed, piece-cut, and parted off, and a positive electrode is obtained.

3. Preparing an Electrolyte Solution

In an argon atmosphere glove box whose moisture content was less than 10 ppm, ethylene carbonate (EC for short), diethyl carbonate (DEC for short), and propylene carbonate (PC for short) were mixed evenly based on a weight ratio of 3:4:3; then fully dried lithium salt $LiPF_6$ was dissolved in the foregoing non-water solvent; and finally 3 wt % fluoroethylene carbonate, 2 wt % 1,3-propane suhone, and 2 wt % succinonitrile were added to make an electrolyte solution.

4. Preparing a Separator

A polyethylene (PE) porous polymer film with a thickness of 7 μm was used as a separator.

5. Preparing of a Lithium-Ion Battery

The positive electrode, the separator, and the negative electrode were laminated in sequence, so that the separator was located between the positive electrode and the negative electrode for separation, and then a bare cell was obtained by winding; after tabs were welded, the bare cell was placed in an aluminum plastic film of outer package foil; the prepared electrolyte solution was injected into the dried bare cell, and a soft package lithium-ion battery was obtained after operations such as vacuum packaging, standing, chemical conversion, shaping, and capacity testing.

II. Test Methods

1. Method for Testing an Aspect Ratio Distribution of the Negative Electrode Active Material The aspect ratio distribution of the negative electrode active material was tested by using a Sympatec QICPIC dynamic particle image analyzer.

2. Method for Testing a Sphericity Distribution of the Negative Electrode Active Material The sphericity distribution of the negative electrode active material was tested by using the Sympatec QICPIC dynamic particle image analyzer.

3. Method for Testing a Bonding Force Between the Negative Electrode Active Material Layer and the Negative Electrode Current Collector The bonding between the negative electrode active material layer and the negative electrode current collector was tested by using an Instron (model number 33652) tester: taking an electrode plate that was 15-20 mm long; fixing the electrode plate on a steel plate by using a 3M double-sided adhesive tape; attaching the adhesive tape to a surface of the negative electrode active material layer, where one side of the adhesive tape was connected to a paper tape having a same width as the adhesive tape; adjusting a limiting block of a tensile machine to an appropriate position, and folding the paper tape up and sliding for 40 mm at a sliding speed of 50 mm/min; and testing the bonding force between the negative electrode active material layer and the negative electrode current collector at 180° (that is, reverse stretching).

4. Method for Testing C004/C110 of the Negative Electrode Active Material Layer

A diffraction pattern of a side (004) and a diffraction pattern of a side (110) in an X-ray diffraction spectrum of the negative electrode active material layer was tested according to Machinery Industry Standard of the People's Republic of China JB/T 4220-2011 *Determination Method of Artificial Graphite Lattice Parameter*. Test conditions were as follows: The X-ray used $CuK_\beta$ radiation, and the $CuK_\beta$ radiation was removed by a filter or a monochromator. A working voltage of an X-ray tube was (30-35) kV, and a working current was (15-20) mA. A scanning speed of a counter was $1/4^{(o)}$/min. When the diffraction pattern of 004 was recorded, a scanning range of a diffraction angle 2 θ was 53°-57°. When the diffraction pattern of 110 was recorded, a scanning range of a diffraction angle 2 θ was 75°-79°. A peak area obtained from the diffraction pattern of (004) was marked as C004. A peak area obtained from the diffraction pattern of (110) was marked as C110. A ratio C004/C110 of the negative electrode active material layer was calculated.

5. Method for Testing a Porosity of the Negative Electrode Active Material Layer A negative electrode active material layer sample was made into a complete wafer. 30 samples were tested in each example or comparative example, and the volume of each sample was approximately 0.35 cm$^3$. The porosity of the negative electrode active material layer was tested according to the standard GB/T24586-2009 *Iron Ores—Determination of Apparent Density, True Density, and Porosity.*

6. Method for Testing Infiltration Time of the Negative Electrode Active Material Layer A negative electrode active material layer sample that was 50 mm long and 50 mm wide was taken. Under a dry condition, a 5 mL electrolyte solution was dripped onto a surface of the sample, and timing started. Timing stopped when the electrolyte solution on the surface of the sample disappeared completely. Timing time was marked as the infiltration time of the negative electrode active material layer. 30 samples were tested in each example or comparative example, and an average value was obtained.

7. Method for Testing Lithium-Ion Liquid-Phase Transfer Resistance ($R_{ion}$)

The lithium-ion battery was connected to a Bio-Logic VMP3B electrochemical workstation manufactured by Bio-Logic France, where a frequency range was 30 mHz to 50 kHz, and amplitude was 5 mV. After data was collected, a complex impedance plane diagram was used to analyze the data and obtain the lithium-ion liquid-phase transfer resistance ($R_{ion}$).

8. Method for Testing a 2C Discharge Capacity Retention Rate of the Lithium-Ion Battery The lithium-ion battery was left to stand at 25° C. for five minutes, then charged to a voltage 4.45V at a constant current of 0.7C, then charged to 0.05C at a constant voltage of 4.45V, left to stand for five minutes, then discharged to a voltage 3.0V at a constant current of 0.5C, and left to stand for five minutes. The foregoing charging and discharging process was repeated. The lithium-ion battery was discharged to a voltage 3.0V at 0.1C, and a 0.1C discharge capacity of the lithium-ion battery was recorded; and then the lithium-ion battery was discharged to a voltage 3.0V at 2C, and a 2C discharge capacity of the lithium-ion battery was recorded. The 2C discharge capacity retention rate of the lithium-ion battery was calculated by using the following formula:

$$2C\text{ discharge capacity retention rate}=2C\text{ discharge capacity}/0.1C\text{ discharge capacity}\times 100\%.$$

9. Method for Testing a Discharge Capacity Retention Rate of the Lithium-Ion Battery at −20° C.

The lithium-ion battery was left to stand at 25° C. for five minutes. The lithium-ion battery was charged to a voltage 4.45V at a constant current of 0.7C, then charged to 0.05C at a constant voltage of 4.45V, and left to stand for five minutes. The lithium-ion battery was discharged to a voltage 3.0V at a constant current of 0.5C, to test a discharge capacity of the lithium-ion battery at 25° C. A furnace temperature was adjusted to −20° C. The foregoing charging and discharging process was repeated, to test a discharge capacity of the lithium-ion battery at −20° C. The discharge capacity retention rate of the lithium-ion battery at −20° C. was calculated by using the following formula:

$$\text{Discharge capacity retention rate}=\text{Discharge capacity at }-20^\circ\text{ C./Discharge capacity at }25^\circ\text{ C.}\times 100\%.$$

10. Method for Testing DC Resistance (DCR) of the Lithium-Ion Battery

At 25° C., the lithium-ion battery was charged to 4.45V at a constant current of 1.5C, then charged to 0.05C at a constant voltage of 4.45V, and left to stand for 30 minutes. The lithium-ion battery was discharged at 0.1C for 10 seconds, where a voltage value was recorded as U1, and the lithium-ion battery was discharged at 1C for 360 seconds, where a voltage value was recorded as U2. The charging and discharging step was repeated five times. "1C" was a current value for completely discharging the capacity of the lithium-ion battery for one hour.

DC resistance R of the lithium-ion battery at 25° C. was calculated by using the following formula:

$$R=(U2-U1)/(1C-0.1C).$$

DC resistance of the lithium-ion battery at 0° C. was tested by using a basically same method, and a difference was only that an operating temperature was 0° C.

Unless otherwise specified, the DCR in this application is DC resistance of the lithium-ion battery at 10% state of charge (SOC).

11. Method for Determining a Lithium Precipitation Phenomenon of the Lithium-Ion Battery The lithium-ion battery was left to stand at 25° C. for five minutes. Based on settings of the examples or the comparative examples, the lithium-ion battery was charged to 4.45V at a constant current of 0.7C or 2C, then charged to 0.05C at a constant voltage of 4.45V, and left to stand for five minutes. Then the lithium-ion battery was discharged to 3.0V at a constant current of 0.5C, and left to stand for five minutes. The foregoing charging and discharging process was repeated 10 times. The battery was fully charged, and disassembled under a dry condition. A status of the negative electrode was photographed and recorded.

A lithium precipitation of the lithium-ion battery was determined according to the following criterion:

When the disassembled negative electrode was golden yellow on the whole, gray could be observed in only a very few positions, and the area of a gray region was less than 2%, it was determined that there was no lithium precipitation.

When the disassembled negative electrode was largely golden yellow, gray could be observed in some positions, and the area of a gray region was 2% to 20%, slight lithium precipitation was determined.

When the disassembled negative electrode was gray on the whole, golden yellow could be observed in some positions, and the area of a gray region was 20% to 60%, lithium precipitation was determined.

When the disassembled negative electrode was gray on the whole and the area of a gray region was greater than 60%, severe lithium precipitation was determined.

12. Method for Testing Charge Transfer Resistance (Rct) of the Lithium-Ion Battery A copper wire was connected additionally in the foregoing process of preparing the lithium-ion battery and used as a reference electrode, and lithium plating was performed on the negative electrode at a current 20 μA for six hours, to obtain a three-electrode lithium-ion battery.

The three-electrode lithium-ion battery was connected to the Bio-Logic VMP3B electrochemical workstation manufactured by Bio-Logic France, where the frequency range was 30 MHz to 50 kHz, and the amplitude was 5 mV. After data was collected, a complex impedance plane diagram was used to analyze the data and obtain the charge transfer resistance (Rct) of the lithium-ion battery.

Figure 3:
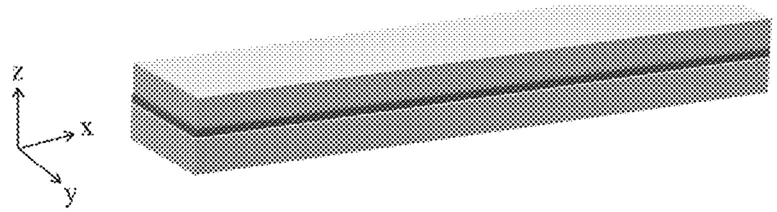
FIG. 3 presents a schematic view of X, Y, and Z directions of a negative electrode structure.

13. Method for Testing a Swelling Rate of the Negative Electrode Along an X/Y Direction A width H1 of the negative electrode after cold pressing along the X/Y direction was tested by using a charge-coupled device (CCD). The negative electrode was made into the lithium-ion battery according to the steps of preparing the lithium-ion battery. The lithium-ion battery was left to stand at 25° C. for five minutes, then charged to 4.45V at a constant current of 0.7C, and then charged to 0.05C at a constant voltage of 4.45V. The lithium-ion battery was disassembled under a dry condition, and the disassembled negative electrode was obtained. A width H2 of the negative electrode along the X/Y direction (as shown in FIG. 3) was tested by using the charge-coupled device (CCD). The swelling rate of the negative electrode along the X/Y direction was calculated by using the following formula:

$$\text{Swelling rate along the } X/Y \text{ direction} = (H2-H1)/H1 \times 100\%.$$

14. Method for Testing a Swelling Rate of the Negative Electrode Along a Z Direction A thickness of the negative electrode processed with a compacted density (1.78 g/cc) was tested, and was marked as T1. The negative electrode was made into the lithium-ion battery according to the steps of preparing the lithium-ion battery. The lithium-ion battery was left to stand at 25° C. for five minutes and then charged to 3.95V (that is, 50% SOC) at a constant current of 0.7C. The lithium-ion battery was disassembled under a dry condition, and the disassembled negative electrode was obtained. Negative electrode thicknesses at a minimum of 14 points were recorded, and an average value was obtained and marked as T2. The swelling rate of the negative electrode along the Z direction was calculated by using the following formula:

$$\text{Swelling rate along the } Z \text{ direction} = (T2-T1)/T1 \times 100\%.$$

15. Method for Testing a Cyclic Swelling Rate and a Cyclic Deformation Rate of the Lithium-Ion Battery The lithium-ion battery was left to stand at 45° C. for five minutes, then charged to 4.45V at a constant current of 0.7C, then charged to 0.05C at a constant voltage of 4.45V, and left to stand for five minutes. Thicknesses at three points of the lithium-ion battery were tested by using a PPG test method, and an average value was obtained and marked as $PPG_0$. Thicknesses at three points of the lithium-ion battery were tested by using an MMC test method, and an average value was obtained and marked as $MMC_0$. Then the lithium-ion battery was discharged to 3.0V at a constant current of 0.5C, and left to stand for five minutes. The foregoing charging and discharging cycle was repeated 500 times. A thickness of the battery was recorded every 50 cycles in the first to the $200^{th}$ charging and discharging cycles; and thickness of the battery was recorded every 100 cycles in the $300^{th}$ to the $500^{th}$ charging and discharging cycles. Thicknesses at three points of the lithium-ion battery were tested every time, and an average value was obtained and marked as PPG and $MMC_x$ (x represented a quantity of cycles). A maximum value of the MMC thicknesses tested at three test points was marked as Max ($MMC_x$). A difference between $MMC_x$ and $MMC_0$ was marked as a battery thickness increment.

The cyclic swelling rate of the lithium-ion battery at 45° C. was calculated by using the following formula:

$$\text{Cyclic swelling rate}(45° \text{ C.}) = MMC_x - MMC_0/MMC_0 \times 100\%.$$

The cyclic deformation rate of the lithium-ion battery at 45° C. was calculated by using the following formula:

$$\text{Cyclic deformation rate}(45° \text{ C.}) = [PPG_x/\text{Max}(MMC_x) - 1] \times 100\%.$$

The foregoing PPG test method was: using a PPG soft package battery thickness gauge (manufactured by Shenzhen Aotomei Automation Technology Co., Ltd), placing the lithium-ion battery on a lower front panel of the thickness gauge, where an upper cover plate dropped at a constant speed in the test process, and measuring thickness of the lithium-ion battery by using a pressure sensor, where the measured thickness was PPG thickness.

The foregoing MMC test method was: using a micrometer tester (manufactured by Mitutoyo Japan, model number: MDC-25 SX) to measure thickness of a tab on the positive electrode of the lithium-ion battery, measuring three different positions of each sample, obtaining an average value, and marking the average value as an MMC thickness.

The cyclic swelling rate and the cyclic deformation rate of the lithium-ion battery at 25° C. were tested by using a basically same method, and a difference was that an operating temperature was 25° C.

16. Method for Testing a Deformation Rate of the Lithium-Ion Battery at 150% SOC The lithium-ion battery was left to stand at 25° C. for five minutes, then charged to 4.45V at a constant current of 0.5C and then charged to 0.025C at a constant voltage of 4.45V (that is, 100% SOC, also known as the state of charge being 1). Then the lithium-ion battery was charged at a constant current of 0.1C for one hour, and left to stand for 30 minutes. The process of charging at a constant current of 0.1C was repeated five times, where the first charging, second charging, third charging, fourth charging, and fifth charging reached 110% SOC (that is, the state of charge was 1.1), 120% SOC (that is, the state of charge was 1.2), 130% SOC (that is, the state of charge was 1.3), 140% SOC (that is, the state of charge was 1.4), and 150% SOC (that is, the state of charge was 1.5) respectively. Duration of each charging was one hour, and the lithium-ion battery was left to stand for 30 minutes after each charging was ended. After five cycles, thicknesses of the lithium-ion battery at three different points at 150% SOC were tested by using the PPG test method, and an average value was obtained and marked as $PPG_5$. Thicknesses of the lithium-ion battery at three different points at 150% SOC were tested by using the MMC test method, and a maximum value was obtained and marked as Max ($MMC_5$). The deformation rate of the lithium-ion battery at 150% SOC was calculated by using the following formula:

$$\text{Deformation rate at 150\% } SOC = [PPG_x/\text{Max}(MMC_5) - 1] \times 100\%.$$

III. Test Results

Table 1 presents impact of the aspect ratio distribution and sphericity distribution of the negative electrode active material on performance of the lithium-ion battery.

The result indicates that, when the aspect ratio distribution and the sphericity distribution of the negative electrode active material satisfied the following conditions: $0.4 \le AR_{10} \le 0.55$, $0.48 \le S_{10} \le 0.60$, $0.6 \le AR_{50} \le 0.75$, $0.68 \le S_{50} \le 0.82$, $0.82 \le AR_{90} \le 0.90$, and $0.85 \le S_{90} \le 0.95$, negative electrode active material particles of different shapes were used in combination, pores were formed between round negative electrode active materials particles, and the pores were filled with slim negative electrode active material particles having corners, so that the negative electrode active material looked round on the whole but still had an appearance with certain corners. Therefore, the swelling rate and DC resistance (DCR) of the lithium-ion battery in high-temperature cycling could be reduced significantly, and a lithium precipitation phenomenon did not occur in the cycling process of the lithium-ion battery. Performance of the lithium-ion battery was improved significantly.

TABLE 1

| | Aspect ratio distribution | | | Sphericity distribution | | | 2 C discharge capacity retention rate | Bonding force between the negative electrode active material layer and the negative electrode current collector | Post-cycle swelling rate at 45° C. (500 | 25° C. OCR | Lithium precipitation phenomenon |
|---|---|---|---|---|---|---|---|---|---|---|---|
| | $AR_{10}$ | $AR_{50}$ | $AR_{90}$ | $S_{10}$ | $S_{50}$ | $S_{90}$ | (−20° C.) | (N/m) | cycles) | (mΩ) | (0.7 C, 25° C.) |
| Example 1 | 0.40 | 0.50 | 0.70 | 0.48 | 0.60 | 0.80 | 30.50% | 23.52 | 10.59% | 61.2 | Slight lithium precipitation |
| Example 2 | 0.45 | 0.60 | 0.80 | 0.52 | 0.70 | 0.82 | 32.35% | 21.03 | 9.08% | 59.3 | Slight lithium precipitation |
| Example 3 | 0.50 | 0.55 | 0.90 | 0.56 | 0.85 | 0.95 | 49.56% | 13.52 | 9.50% | 50.5 | No lithium precipitation |
| Example 4 | 0.55 | 0.80 | 0.96 | 0.60 | 0.90 | 0.99 | 53.34% | 10.42 | 8.73% | 49.2 | No lithium precipitation |
| Example 5 | 0.40 | 0.60 | 0.82 | 0.48 | 0.68 | 0.85 | 39.70% | 20.09 | 8.72% | 57.6 | No lithium precipitation |
| Example 6 | 0.43 | 0.60 | 0.82 | 0.51 | 0.68 | 0.85 | 39.50% | 22.05 | 8.27% | 57.2 | No lithium precipitation |
| Example 7 | 0.43 | 0.63 | 0.82 | 0.51 | 0.68 | 0.88 | 40.90% | 20.58 | 8.17% | 57.1 | No lithium precipitation |
| Example 8 | 0.43 | 0.63 | 0.84 | 0.51 | 0.72 | 0.88 | 43.70% | 22.54 | 8.07% | 56.9 | No lithium precipitation |
| Example 9 | 0.46 | 0.63 | 0.84 | 0.54 | 0.72 | 0.88 | 44.40% | 23.52 | 7.90% | 56.2 | No lithium precipitation |
| Example 10 | 0.46 | 0.66 | 0.84 | 0.54 | 0.72 | 0.90 | 45.70% | 24.01 | 7.06% | 56.2 | No lithium precipitation |
| Example 11 | 0.46 | 0.66 | 0.86 | 0.54 | 0.75 | 0.90 | 46.00% | 18.24 | 7.73% | 56.1 | No lithium precipitation |
| Example 12 | 0.49 | 0.66 | 0.86 | 0.57 | 0.75 | 0.90 | 44.70% | 18.62 | 7.98% | 55.4 | No lithium precipitation |
| Example 13 | 0.49 | 0.69 | 0.86 | 0.57 | 0.75 | 0.92 | 46.20% | 19.6 | 8.74% | 55.6 | No lithium precipitation |
| Example 14 | 0.49 | 0.69 | 0.88 | 0.57 | 0.78 | 0.92 | 49.20% | 19.6 | 7.76% | 55.4 | No lithium precipitation |
| Example 15 | 0.52 | 0.69 | 0.88 | 0.60 | 0.78 | 0.92 | 47.00% | 21.56 | 7.57% | 54.7 | No lithium precipitation |
| Example 16 | 0.52 | 0.72 | 0.88 | 0.60 | 0.78 | 0.95 | 46.90% | 21.07 | 7.13% | 54.6 | No lithium precipitation |
| Example 17 | 0.52 | 0.72 | 0.90 | 0.60 | 0.82 | 0.95 | 46.30% | 19.11 | 7.45% | 54.5 | No lithium precipitation |
| Example 18 | 0.55 | 0.72 | 0.90 | 0.60 | 0.78 | 0.95 | 47.70% | 18.98 | 7.75% | 54.2 | No lithium precipitation |
| Example 19 | 0.55 | 0.75 | 0.90 | 0.60 | 0.82 | 0.95 | 46.50% | 18.56 | 8.94% | 52.5 | No lithium precipitation |
| Comparative example 1 | 0.10 | 0.60 | 0.80 | 0.20 | 0.40 | 0.60 | 25.20% | 15.82 | 15.69% | 78.9 | Severe lithium precipitation |
| Comparative example 2 | 0.20 | 0.70 | 0.95 | 0.30 | 0.50 | 0.95 | 30.20% | 13.42 | 11.55% | 69.2 | Lithium precipitation |

Table 2 presents impact of the orientation of the negative electrode active material layer on performance of the lithium-ion battery.

The result indicates that, as the aspect ratio and the sphericity of the particle was reduced, the C004/C110 value of the negative electrode active material layer increased, so that the swelling rate of the negative electrode active material layer along the Z direction decreased, and the thickness increment of the battery decreased. On the basis that the aspect ratio distribution and the sphericity distribution of the negative electrode active material satisfied the following conditions: $0.4 \le AR_{10} \le 0.55$, $0.48 \le S_{10} \le 0.60$, $0.6 \le AR_{50} \le 0.75$, $0.68 \le S_{50} \le 0.82$, $0.82 \le AR_{90} \le 0.90$, and $0.85 \le S_{90} \le 0.95$, when the C004/C110 value of the negative electrode active material layer was in a range of 10 to 20, stresses generated by intercalation and de-intercalation of lithium-ion were released to all directions, and swelling rates along the Z direction and the X/Y direction were balanced. In this way, the overcharging deformation rate, the thickness increment, and the post-cycle deformation rate of the lithium-ion battery could be reduced significantly. The deformation problem of the lithium-ion battery was significantly mitigated.

TABLE 2

| | Aspect ratio distribution | | | Sphericity distribution | | | | Swelling rate of the negative electrode along the Z | Swelling rate of the negative electrode along the X/Y | Thickness at 150% SOC | Deformation rate at 150% | Battery thickness increment | Post-cycle deformation rate | |
|---|---|---|---|---|---|---|---|---|---|---|---|---|---|---|
| | $AR_{10}$ | $AR_{50}$ | $AR_{90}$ | $S_{10}$ | $S_{50}$ | $S_{90}$ | C004/C110 | direction | direction | (mm) | SOC | (mm) | 25° C. | 45° C. |
| Example 10 | 0.46 | 0.66 | 0.86 | 0.54 | 0.75 | 0.90 | 15 | 17.50% | 0.27% | 3.395 | 0.55% | 0.215 | 1.62% | 3.15% |
| Example 20 | 0.55 | 0.74 | 0.90 | 0.61 | 0.80 | 0.93 | 10 | 15.90% | 0.37% | 3.344 | 1.15% | 0.180 | 1.90% | 2.50% |
| Example 21 | 0.53 | 0.70 | 0.87 | 0.60 | 0.80 | 0.90 | 12 | 16.60% | 0.35% | 3.356 | 0.98% | 0.198 | 1.90% | 2.70% |
| Example 22 | 0.49 | 0.70 | 0.86 | 0.57 | 0.77 | 0.92 | 14 | 16.70% | 0.33% | 3.365 | 0.82% | 0.212 | 1.70% | 3.00% |
| Example 23 | 0.46 | 0.66 | 0.85 | 0.55 | 0.75 | 0.90 | 16 | 17.30% | 0.29% | 3.369 | 0.52% | 0.218 | 1.60% | 3.20% |
| Example 24 | 0.43 | 0.66 | 0.85 | 0.51 | 0.72 | 0.88 | 18 | 17.60% | 0.25% | 3.372 | 0.43% | 0.223 | 1.40% | 3.30% |
| Example 25 | 0.42 | 0.63 | 0.82 | 0.51 | 0.70 | 0.89 | 20 | 18.00% | 0.23% | 3.535 | 0.35% | 0.230 | 1.40% | 3.70% |
| Example 26 | 0.40 | 0.70 | 0.95 | 0.48 | 0.78 | 0.98 | 5 | 14.70% | 0.39% | 3.363 | 0.96% | 0.150 | 2.60% | 3.22% |
| Example 27 | 0.40 | 0.50 | 0.70 | 0.48 | 0.60 | 0.80 | 23 | 19.52% | 0.21% | 3.542 | 0.88% | 0.250 | 2.10% | 3.32% |

Table 3 presents impact of the percentage of primary particles and the compacted density of the negative electrode active material, and the weight and coating of the negative electrode active material layer on performance of the lithium-ion battery. Except parameters listed in Table 3, all settings in Examples 28-39 were the same as those in Example 10.

TABLE 3

| | Percentage of primary particles | Percentage of secondary particles | Compacted powder density of the negative electrode active material ($g/cm^3$) | Weight of the negative electrode active material layer ($mg/mm^2$) | Whether coating exists between the negative electrode current collector and the negative electrode active material layer | Ratio of thickness of coating to thickness of the negative electrode active material layer | 25° C. Rct (mΩ 25° C.) | Lithium precipitation phenomenon (2 C, 25° C.) |
|---|---|---|---|---|---|---|---|---|
| Example 10 | 20% | 80% | 1.90 | 0.100 | Yes | 1:130 | 5.8 | No lithium precipitation |
| Example 28 | 20% | 80% | 1.90 | 0.095 | Yes | 1:50 | 5.7 | No lithium precipitation |
| Example 29 | 30% | 70% | 1.92 | 0.098 | Yes | 1:80 | 5.9 | No lithium precipitation |
| Example 30 | 40% | 60% | 1.94 | 0.101 | Yes | 1:110 | 7.7 | No lithium precipitation |
| Example 31 | 55% | 45% | 1.96 | 0.105 | Yes | 1:150 | 8.6 | No lithium precipitation |
| Example 32 | 40% | 60% | 1.94 | 0.098 | Yes | 1:80 | 5.5 | No lithium precipitation |

TABLE 3-continued

| | Percentage of primary particles | Percentage of secondary particles | Compacted powder density of the negative electrode active material (g/cm$^3$) | Weight of the negative electrode active material layer (mg/mm$^2$) | Whether coating exists between the negative electrode current collector and the negative electrode active material layer | Ratio of thickness of coating to thickness of the negative electrode active material layer | 25° C. Rct (mΩ 25° C.) | Lithium precipitation phenomenon (2 C, 25° C.) |
|---|---|---|---|---|---|---|---|---|
| Example 33 | 40% | 60% | 1.94 | 0.098 | No | 0 | 9.1 | Slight lithium precipitation |
| Example 34 | 10% | 90% | 1.86 | 0.098 | Yes | 1:80 | 4.5 | Slight lithium precipitation |
| Example 35 | 70% | 30% | 1.97 | 0.098 | Yes | 1:80 | 10.2 | Slight lithium precipitation |
| Example 36 | 40% | 60% | 1.94 | 0.075 | Yes | 1:40 | 4.0 | No lithium precipitation |
| Example 37 | 40% | 60% | 1.94 | 0.120 | Yes | 1:200 | 15.3 | Lithium precipitation |
| Example 38 | 100% | 0% | 1.98 | 0.098 | Yes | 1:80 | 28.4 | Severe lithium precipitation |
| Example 39 | 0% | 100% | 1.80 | 0.098 | Yes | 1:80 | 18.2 | Lithium precipitation |

The result indicates that, as the percentage of primary particles in the negative electrode active material increased, the compacted density of the negative electrode active material increased. When the percentage of primary particles in the negative electrode active material was the same, reducing the weight of the negative electrode active material layer could reduce the thickness of the negative electrode active material layer, so that charge transfer resistance (Rct) of a lithium ion entering a vicinity of the current collector through a pore between particles was reduced, and that a lithium precipitation phenomenon of the lithium-ion battery could be alleviated. In addition, adding the coating (that is, a conductive layer) could increase the transmission speed of lithium ions, and reduce the charge transfer resistance (Rct) of the lithium-ion battery, thereby alleviating the lithium precipitation phenomenon in a high-rate lithium intercalation process.

Table 4 presents impact of the porosity of the negative electrode active material layer on performance of the lithium-ion battery.

TABLE 4

| | Aspect ratio distribution | | | Sphericity distribution | | | | Infiltration time of electrode plate | $R_{ion}$ | (0° C. Rct | 0° C. DCR | 2 C discharge capacity | Lithium precipitation phenomenon |
|---|---|---|---|---|---|---|---|---|---|---|---|---|---|
| | $AR_{10}$ | $AR_{50}$ | $AR_{90}$ | $S_{10}$ | $S_{50}$ | $S_{90}$ | Porosity | (minutes) | (mΩ) | (mΩ) | (mΩ) | retention rate | (2 C, 25° C.) |
| Example 10 | 0.46 | 0.66 | 0.86 | 0.54 | 0.75 | 0.9 | 36% | 1.7 | 14.5 | 48.22 | 220.5 | 83.40% | No lithium precipitation |
| Example 40 | 0.46 | 0.66 | 0.86 | 0.54 | 0.75 | 0.9 | 45% | 0.9 | 10.8 | 35.30 | 200.6 | 86.58% | No lithium precipitation |
| Example 41 | 0.46 | 0.66 | 0.86 | 0.54 | 0.75 | 0.9 | 40% | 1.5 | 13.7 | 39.20 | 208.8 | 85.12% | No lithium precipitation |
| Example 42 | 0.46 | 0.66 | 0.86 | 0.54 | 0.75 | 0.9 | 30% | 2.5 | 15.2 | 46.30 | 217.1 | 81.40% | No lithium precipitation |
| Example 43 | 0.46 | 0.66 | 0.86 | 0.54 | 0.75 | 0.9 | 25% | 2.9 | 16.1 | 47.35 | 223.5 | 79.92% | No lithium precipitation |
| Example 44 | 0.46 | 0.66 | 0.86 | 0.54 | 0.75 | 0.9 | 20% | 3.4 | 17.5 | 49.90 | 229.4 | 78.81% | No lithium precipitation |
| Example 45 | 0.46 | 0.66 | 0.86 | 0.54 | 0.75 | 0.9 | 18% | 3.9 | 18.6 | 59.30 | 230.5 | 76.58% | No lithium precipitation |
| Example 46 | 0.46 | 0.66 | 0.86 | 0.54 | 0.75 | 0.9 | 47% | 0.7 | 8.7 | 33.20 | 196.3 | 89.42% | No lithium precipitation |
| Example 47 | 0.55 | 0.75 | 0.9 | 0.6 | 0.82 | 0.95 | 45% | 0.3 | 10.3 | 32.50 | 200.2 | 87.54% | No lithium precipitation |
| Example 48 | 0.5 | 0.72 | 0.9 | 0.57 | 0.82 | 0.95 | 43% | 0.5 | 12.5 | 35.40 | 203.5 | 82.40% | No lithium precipitation |
| Example 49 | 0.46 | 0.69 | 0.86 | 0.54 | 0.8 | 0.92 | 40% | 0.8 | 13.3 | 41.60 | 206.8 | 88.40% | No lithium precipitation |
| Example 50 | 0.46 | 0.66 | 0.83 | 0.54 | 0.77 | 0.9 | 37% | 1.5 | 14.2 | 42.23 | 210.6 | 80.10% | No lithium precipitation |
| Example 51 | 0.43 | 0.65 | 0.84 | 0.51 | 0.74 | 0.9 | 35% | 2.1 | 14.7 | 44.67 | 212.7 | 78.80% | No lithium precipitation |
| Example 52 | 0.41 | 0.62 | 0.83 | 0.51 | 0.7 | 0.88 | 30% | 3.0 | 15.6 | 48.20 | 223.1 | 78.60% | No lithium precipitation |

TABLE 4-continued

| | Aspect ratio distribution | | | Sphericity distribution | | | | Infiltration time of electrode plate | $R_{ion}$ | (0° C. Rct | 0° C. DCR | 2 C discharge capacity | Lithium precipitation phenomenon |
|---|---|---|---|---|---|---|---|---|---|---|---|---|---|
| | $AR_{10}$ | $AR_{50}$ | $AR_{90}$ | $S_{10}$ | $S_{50}$ | $S_{90}$ | Porosity | (minutes) | (mΩ) | (mΩ) | (mΩ) | retention rate | (2 C, 25° C.) |
| Example 53 | 0.4 | 0.6 | 0.7 | 0.82 | 0.68 | 0.85 | 25% | 4.0 | 16.5 | 58.99 | 228.5 | 77.50% | No lithium precipitation |
| Example 54 | 0.55 | 0.8 | 0.93 | 0.6 | 0.88 | 0.98 | 55% | 0.1 | 5.3 | 25.30 | 172.2 | 92.76% | No lithium precipitation |

The result indicates that, when the porosity of the negative electrode active material layer was in a range of 20% to 45%, time of electrolyte solution infiltration into the negative electrode active material layer was shortened significantly, and the lithium-ion liquid-phase transfer resistance ($R_{ion}$), the charge transfer resistance (Rct), and the DC resistance (DCR) of the lithium-ion battery were all reduced significantly. Therefore, the 2C discharge rate could be improved and the lithium precipitation phenomenon of the lithium-ion battery could be alleviated significantly, thus significantly improving rate performance of the lithium-ion battery.

In this specification, reference to "an embodiment", "some embodiments", "one embodiment", "another example", "an example", "a specific example", or "some examples" means that at least one embodiment or example in this application includes a specific feature, structure, material, or characteristic described in this embodiment or example. Therefore, descriptions that appear in various parts of this specification, such as "in some implementation solutions", "in an embodiment", "in one embodiment", "in another example", "in an example", "in a specific example", or "an example" do not necessarily refer to the same embodiment or example in this application. In addition, a specific feature, structure, material, or characteristic herein may be combined in any appropriate manner in one or more embodiments or examples.

Although illustrative embodiments have been demonstrated and described, a person skilled in the art should understand that the foregoing embodiments are not to be construed as limiting this application, and that the embodiments may be changed, replaced, and modified without departing from the spirit, principle, and scope of this application.

What is claimed is:

1. A negative electrode active material, wherein, particles of the negative electrode active material at a cumulative particle volume distribution of the negative electrode active material of 10%, as tested by using a dynamic particle image analyzer, have an aspect ratio $AR_{10}$ of $0.4 \le AR_{10} \le 0.55$, and a sphericity $S_{10}$ of $0.48 \le S_{10} \le 0.60$;

wherein particles of the negative electrode material at the cumulative particle volume distribution of the negative electrode active material of 50%, as tested by using the dynamic particle image analyzer, have an aspect ratio $AR_{50}$ of $0.6 \le AR_{50} \le 0.75$, and a sphericity $S_{50}$ of $0.68 \le S_{50} \le 0.82$;

wherein particles of the negative electrode material at the cumulative particle volume distribution of the negative electrode active material of 90%, as tested by using the dynamic particle image analyzer, have an aspect ratio $AR_{90}$ of $0.82 \le AR_{90} \le 0.90$, and a sphericity $S_{90}$ of $0.85 \le S_{90} \le 0.95$.

2. The negative electrode active material according to claim 1, wherein a compacted density of the negative electrode active material is greater than 1.90 $g/cm^3$.

3. The negative electrode active material according to claim 1, wherein the negative electrode active material comprises primary particles and secondary particles, and based on a total quantity of particles of the negative electrode active material, a quantity of the primary particles is 20% to 55%.

4. An electrochemical apparatus, comprising a positive electrode, a negative electrode, a separator, and an electrolyte solution, the negative electrode comprising a negative electrode current collector and a negative electrode active material layer, wherein the negative electrode active material layer comprises a negative electrode active material;

the negative electrode active material, wherein, particles of the negative electrode active material at a cumulative particle volume distribution of the negative electrode active material of 10%, as tested by using a dynamic particle image analyzer, have an aspect ratio $AR_{10}$ of $0.4 \le AR_{10} \le 0.55$, and a sphericity $S_{10}$ of $0.48 \le S_{10} \le 0.60$;

wherein particles of the negative electrode material at the cumulative particle volume distribution of the negative electrode active material of 50%, as tested by using the dynamic particle image analyzer, have an aspect ratio $AR_{50}$ of $0.6 \le AR_{50} \le 0.75$, and a sphericity $S_{50}$ of $0.68 \le S_{50} \le 0.82$;

wherein particles of the negative electrode material at the cumulative particle volume distribution of the negative electrode active material of 90%, as tested by using the dynamic particle image analyzer, have an aspect ratio $AR_{90}$ of $0.82 \le AR_{90} \le 0.90$, and a sphericity $S_{90}$ of $0.85 \le S_{90} \le 0.95$.

5. The electrochemical apparatus according to claim 4, wherein a compacted density of the negative electrode active material is greater than 1.90 $g/cm^3$.

6. The electrochemical apparatus according to claim 4, wherein the negative electrode active material comprises primary particles and secondary particles, and based on a total quantity of particles of the negative electrode active material, a quantity of the primary particles is 20% to 55%.

7. The electrochemical apparatus according to claim 4, wherein the negative electrode satisfies at least one of conditions (e) and (g):

(e) weight of the negative electrode active material layer is 0.095 $mg/mm^2$ to 0.105 $mg/mm^2$;

and (g) the negative electrode active material layer has a porosity of 20% to 45%.

8. The electrochemical apparatus according to claim 4, wherein a coating is further comprised between the negative electrode current collector and the negative electrode active material layer, and a ratio of thickness of the coating to thickness of the negative electrode active material layer is in a range of 1:50 to 1:120.

9. The electrochemical apparatus according to claim 4, wherein a bonding force between the negative electrode active material layer and the negative electrode current collector is greater than 18 N/m.

10. The electrochemical apparatus according to claim 4, wherein the electrochemical apparatus satisfies the following relationship: $Y \leq 0.417X + A$, wherein X is a state of charge of the electrochemical apparatus, and $1 < X \leq 1.5$; and when the state of charge of the electrochemical apparatus is 1, thickness of the electrochemical apparatus is A mm; or when the state of charge of the electrochemical apparatus is X, thickness of the electrochemical apparatus is Y mm.

11. The electrochemical apparatus according to claim 4, wherein a ratio C004/C110 of a peak area C004 of a side (004) to a peak area C110 of a side (110) of the negative electrode active material layer, obtained by performing an X-ray diffraction spectrum test, is in a range of 10 to 20.

12. An electronic apparatus, comprising an electrochemical apparatus, the electrochemical apparatus comprising a comprising a positive electrode, a negative electrode, a separator, and an electrolyte solution, the negative electrode comprising a negative electrode current collector and a negative electrode active material layer, wherein the negative electrode active material layer comprises an negative electrode active material;

the negative electrode active material, wherein, particles of the negative electrode active material at a cumulative particle volume distribution of the negative electrode active material of 10%, as tested by using a dynamic particle image analyzer, have an aspect ratio $AR_{10}$ of $0.4 \leq AR_{10} \leq 0.55$, and a sphericity $S_{10}$ of $0.48 \leq S_{10} \leq 0.60$;

wherein particles of the negative electrode material at the cumulative particle volume distribution of the negative electrode active material of 50%, as tested by using the dynamic particle image analyzer, have an aspect ratio $AR_{50}$ of $0.6 \leq AR_{50} \leq 0.75$, and a sphericity $S_{50}$ of $0.68 \leq S_{50} \leq 0.82$;

wherein particles of the negative electrode material at the cumulative particle volume distribution of the negative electrode active material of 90%, as tested by using the dynamic particle image analyzer, have an aspect ratio $AR_{90}$ of $0.82 \leq AR_{90} \leq 0.90$, and a sphericity $S_{90}$ of $0.85 \leq S_{90} \leq 0.95$.

13. The electronic apparatus according to claim 12, wherein a ratio C004/C110 of a peak area C004 of a side (004) to a peak area C110 of a side (110) of the negative electrode active material layer, obtained by performing an X-ray diffraction spectrum test, is in a range of 10 to 20.

* * * * *